No. 774,247. PATENTED NOV. 8, 1904.
G. W. HEY.
POSTMARKING AND STAMP CANCELING MACHINE.
APPLICATION FILED JULY 21, 1890.
NO MODEL. 7 SHEETS—SHEET 4.
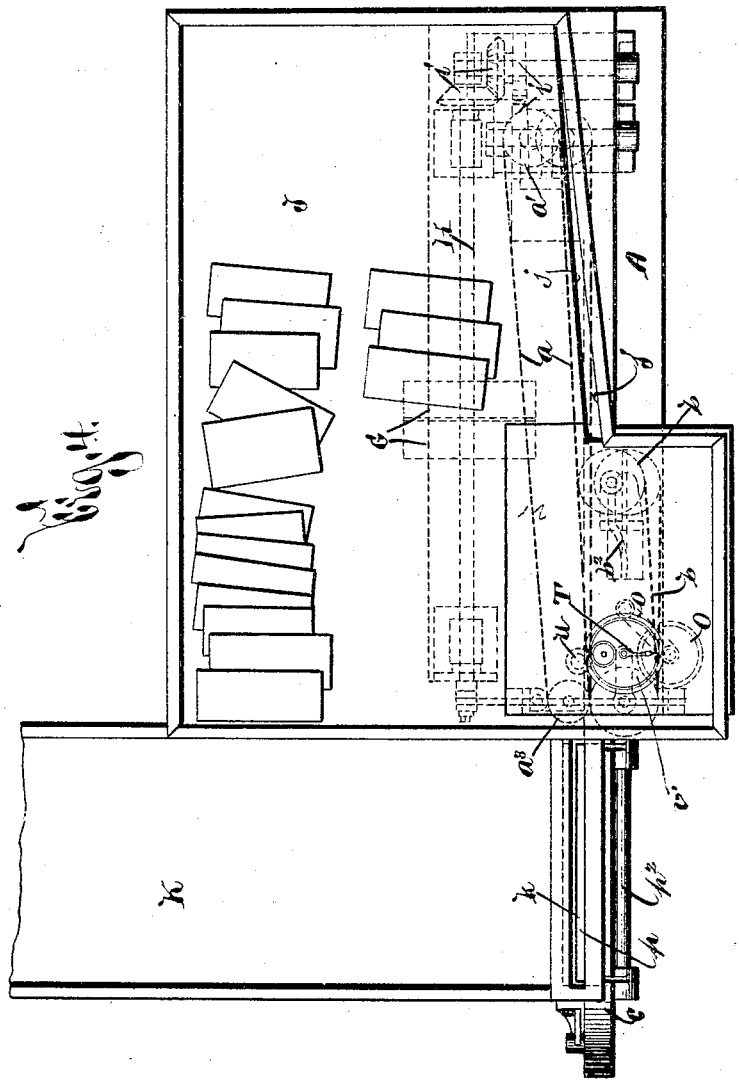

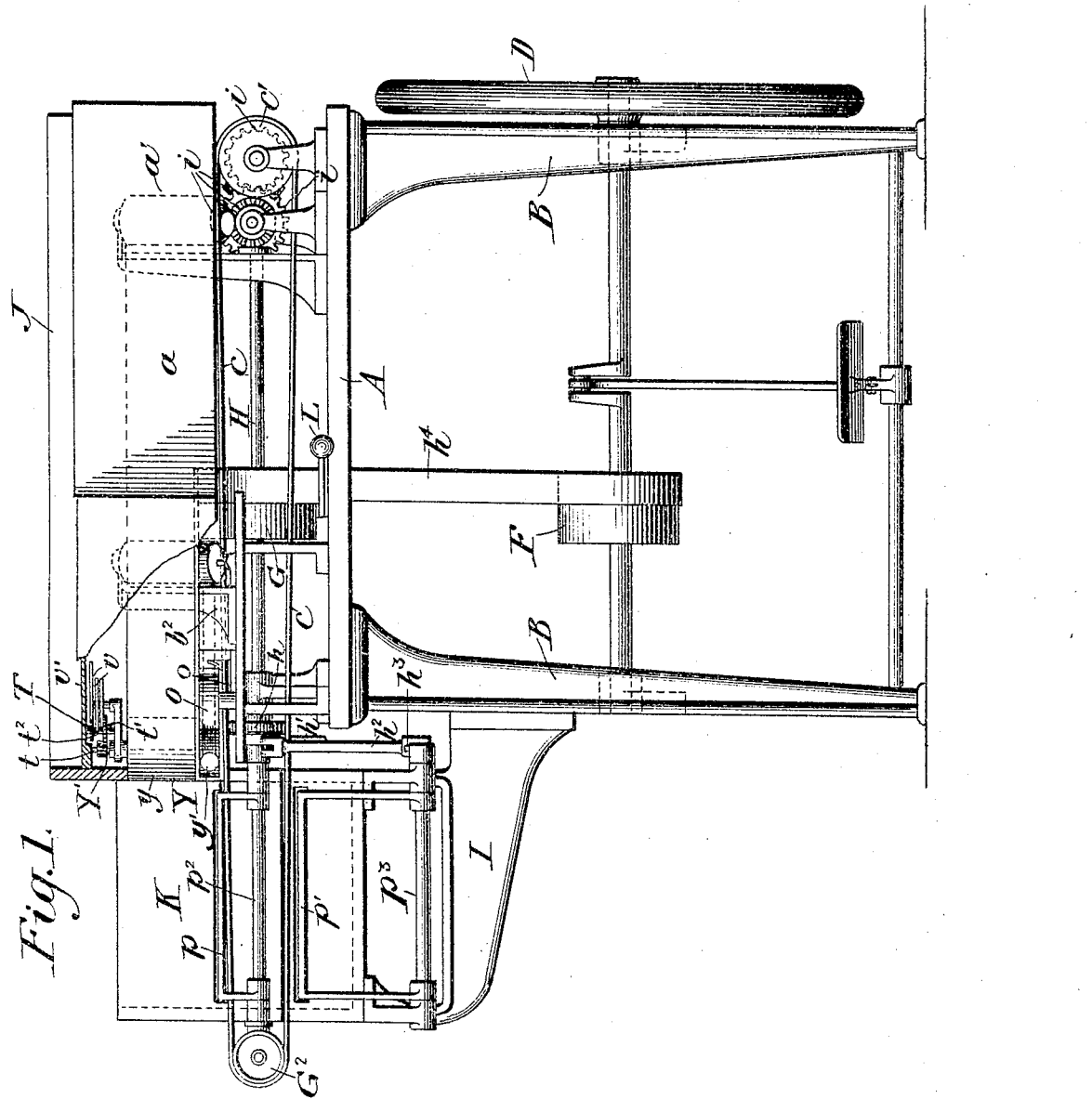

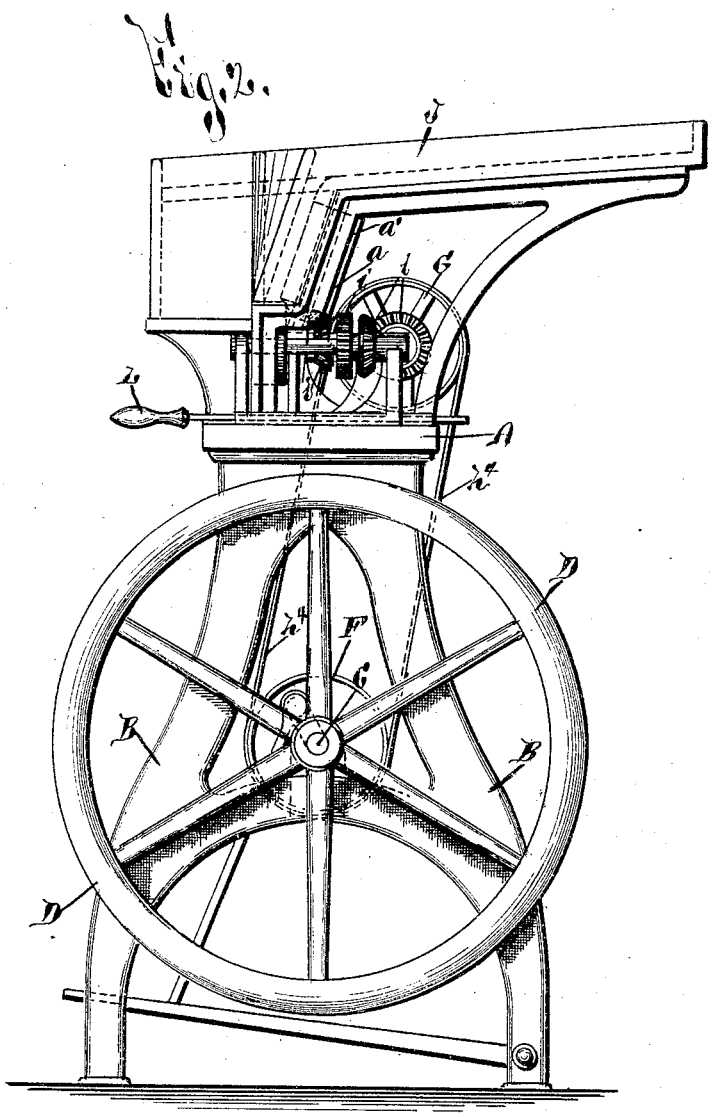

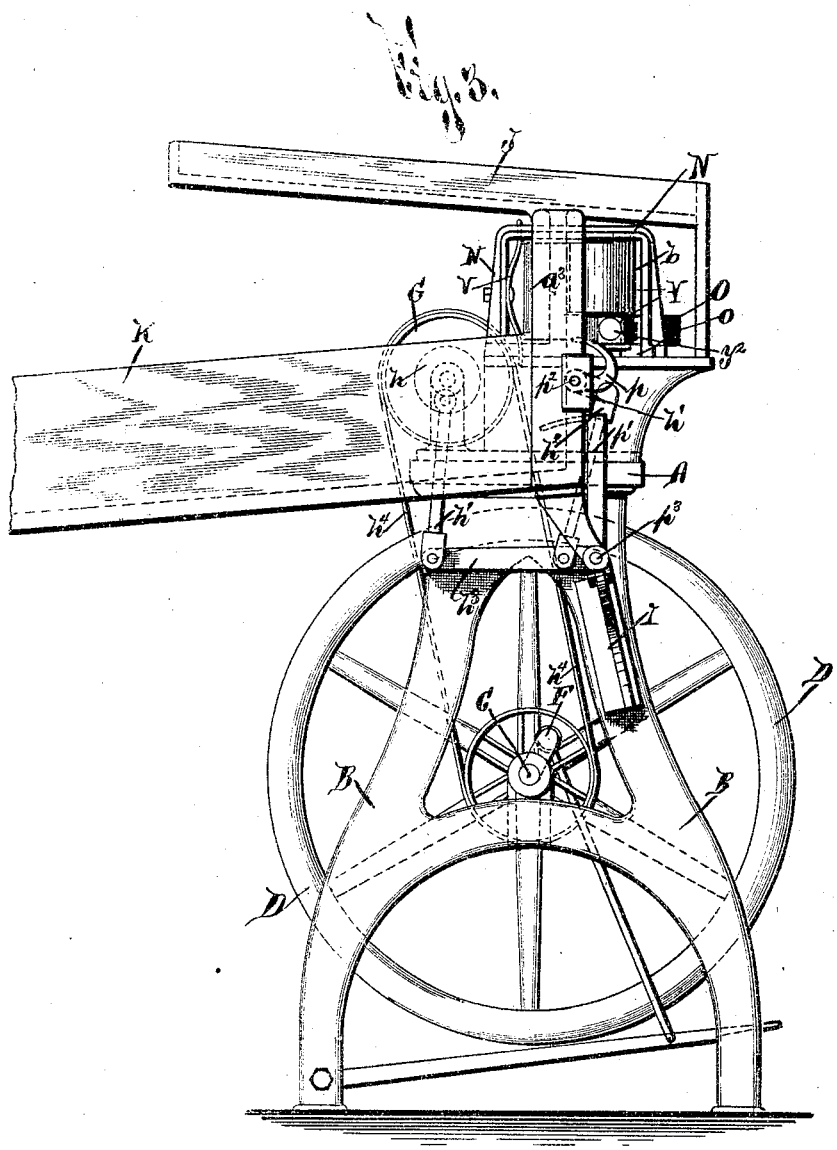

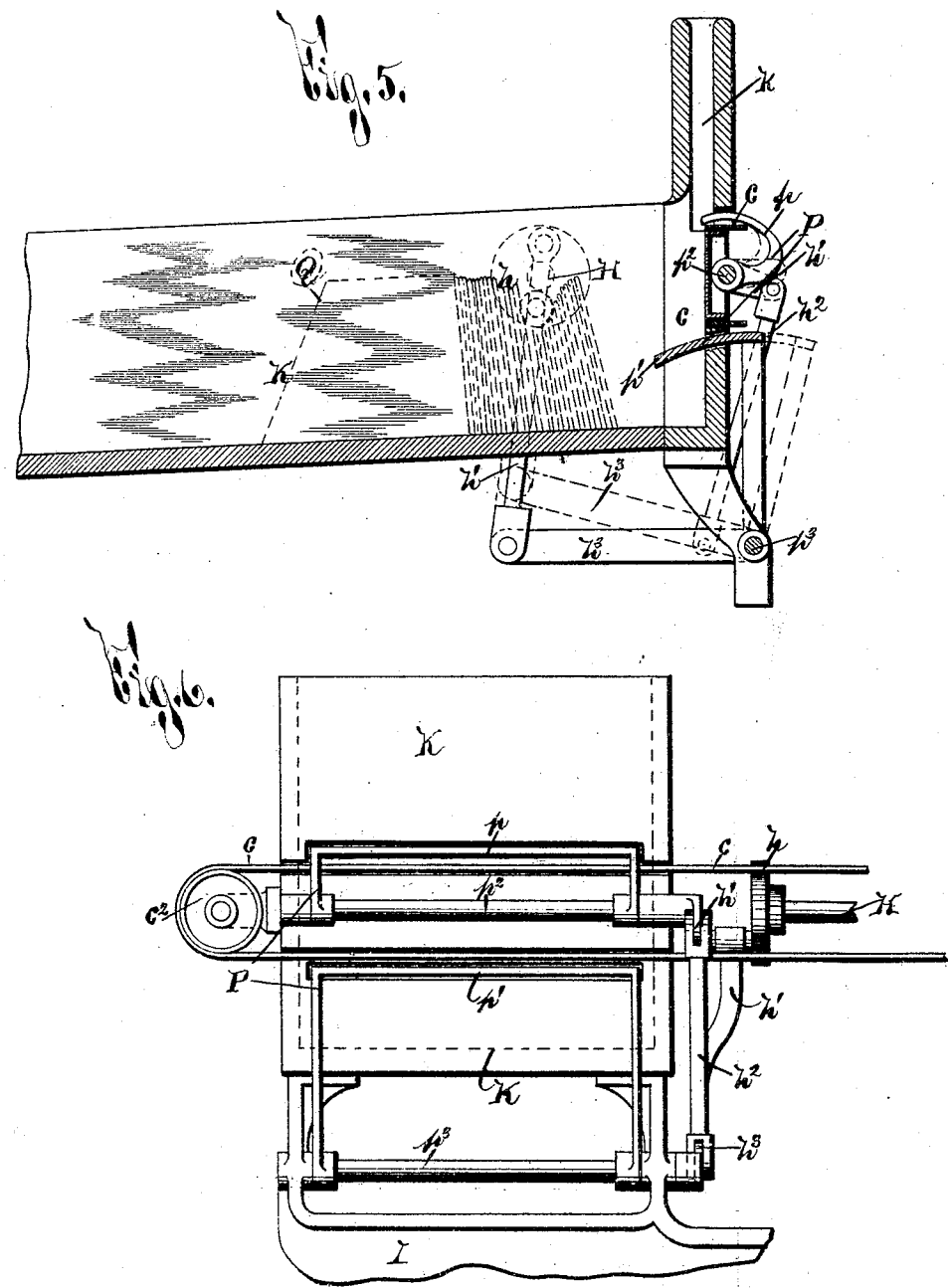

No. 774,247. PATENTED NOV. 8, 1904.
G. W. HEY.
POSTMARKING AND STAMP CANCELING MACHINE.
APPLICATION FILED JULY 21, 1890.
NO MODEL. 7 SHEETS—SHEET 6.
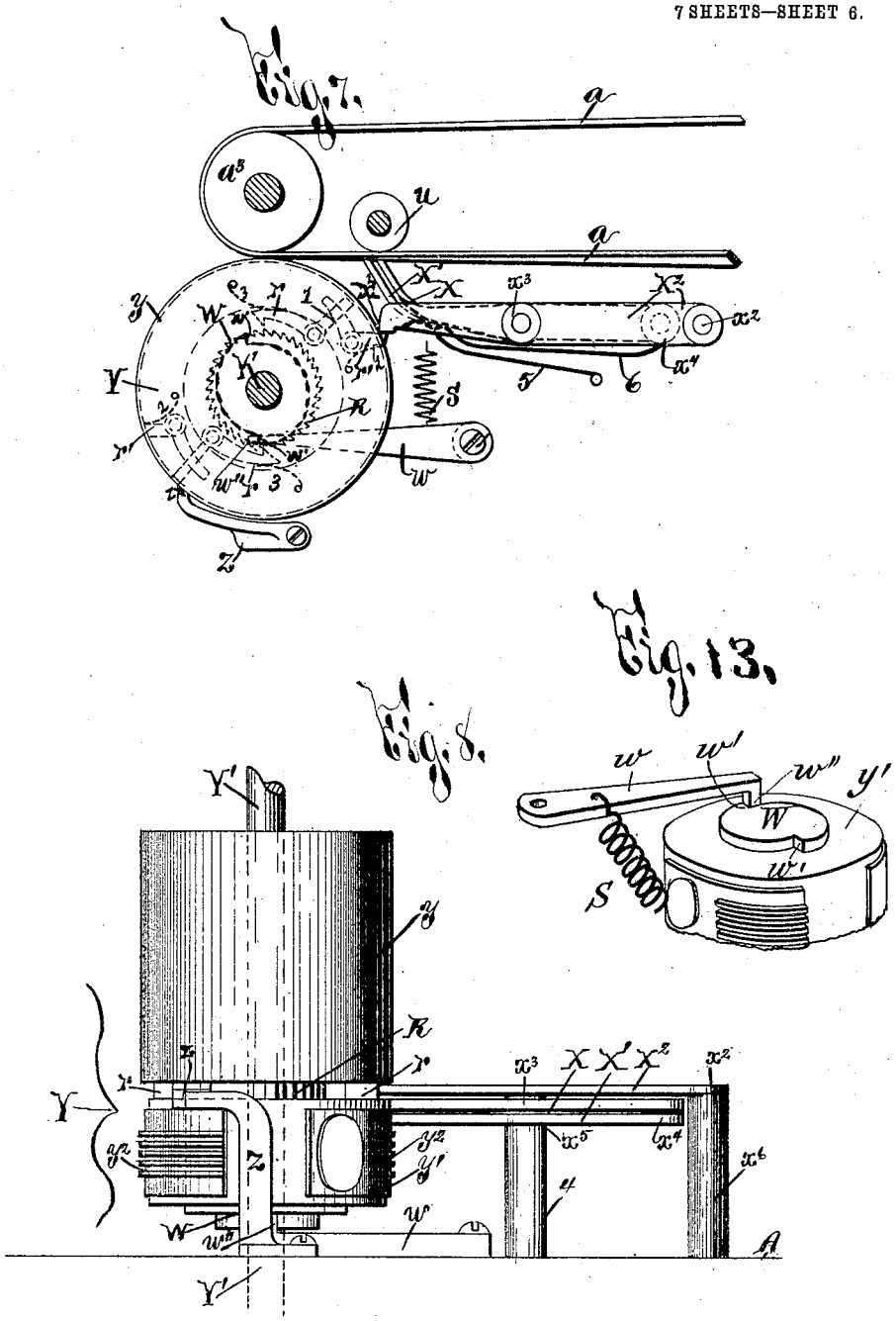

No. 774,247. PATENTED NOV. 8, 1904.
G. W. HEY.
POSTMARKING AND STAMP CANCELING MACHINE.
APPLICATION FILED JULY 21, 1890.
NO MODEL. 7 SHEETS—SHEET 7.
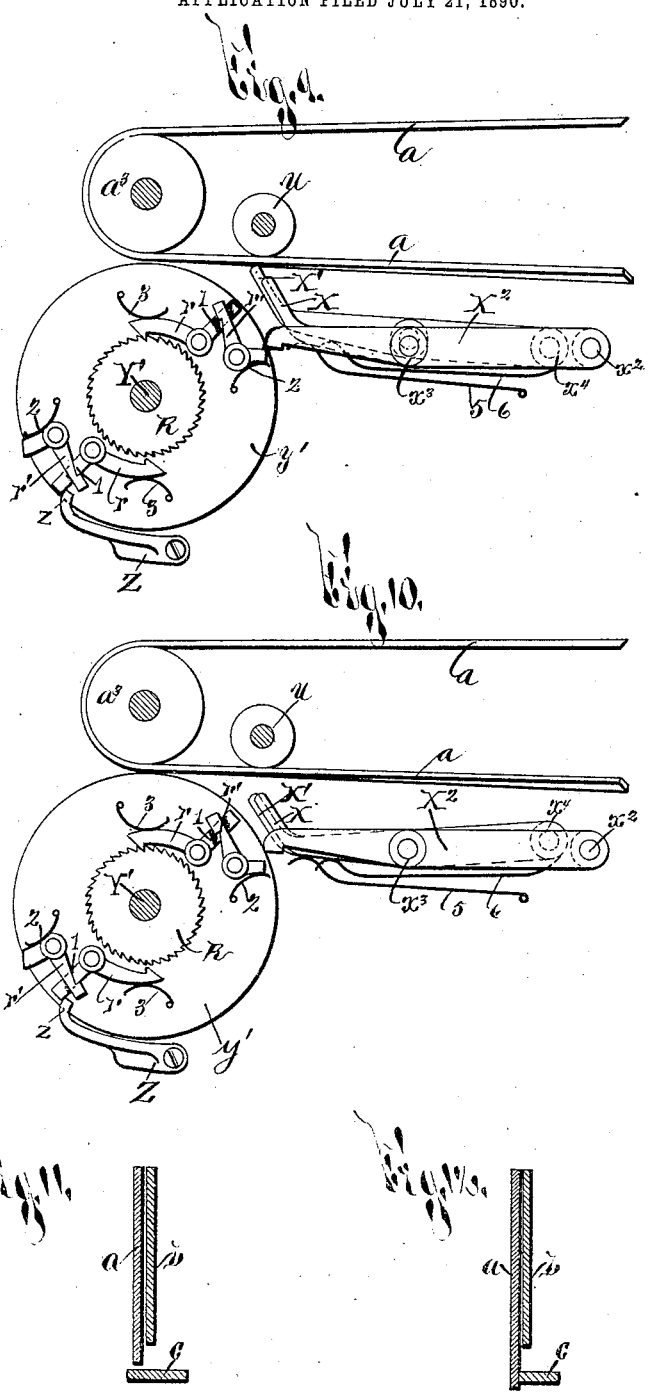

No. 774,247. Patented November 8, 1904.

UNITED STATES PATENT OFFICE.

GEORGE W. HEY, OF SYRACUSE, NEW YORK.

POSTMARKING AND STAMP-CANCELING MACHINE.

SPECIFICATION forming part of Letters Patent No. 774,247, dated November 8, 1904.

Application filed July 21, 1890. Serial No. 359,361. (No model.)

*To all whom it may concern:*

Be it known that I, GEORGE W. HEY, of Syracuse, in the county of Onondaga, in the State of New York, have invented new and useful Improvements in Postmarking and Stamp-Canceling Machines, of which the following, taken in connection with the accompanying drawings, is a full, clear, and exact description.

My invention has for its object the production of an automatic machine for stamp-canceling and postmarking letters and mail-matter generally; and it consists, essentially, in a stamp-canceling and postmarking device located normally in the path of movement of the mail-matter on the supporting feed-bed of the machine and a contact-finger lying normally in said path and connected to the marker, whereby the same automatically defines the starting and stopping point of the impression on the mail-matter while in transit without the necessity of stopping and timing said mail-matter as it is fed through the machine.

It consists also in a marking device composed of two sections mounted on a common spindle, one section carrying a feeding-belt and the other section a marking-die and in combining with said marking device mechanism for bringing the die into action by the letter or mail-matter while in transit.

It also consists in providing the marker with means for stopping the impression-die so as to automatically define the impression.

It consists also in combining with the feed-bed belts or conveyers, with their carrying-surfaces contiguous, between which the mail-matter is fed to the stamp or marker, one of said carriers being of less width than the other to permit the marking-die to protrude into the path of the moving mail-matter, as hereinafter more particularly described.

It furthermore consists in combining with the above-mentioned carriers a lip or bottom belt which serves to bring the letters in position to be taken by the above-mentioned carriers and fed to the marker.

It consists also in combining with the marker a letter-counter which operates in unison with the marker when the latter is set in motion by a letter encountering the contact-finger and counts the letters as they are fed past the marker.

It consists also in combining with the main shaft of the machine a letter-tray and an oscillating letter-packer, by means of which the letters are packed or bunched as they issue from the marker mechanism and propelled to the outgoing mails.

It consists, furthermore, in the detail construction, combination, and arrangement of the parts, all as hereinafter more fully described, and pointed out in the claims.

In specifying my invention reference is had to the accompanying drawings, in which like characters indicate corresponding parts in all the views.

Figure 1 is a side elevation illustrating the general arrangement of the parts with the side wall of the facing-table next to the marking apparatus and counter broken away to illustrate those parts. Fig. 2 is an end elevation showing the arrangement of the gears and actuating mechanism. Fig. 3 shows the opposite end of the machine in elevation, illustrating the letter tray and packing mechanism; also, the marker, inking-roller, and yoke for supporting the marker. Fig. 4 is a top plan showing the facing-table, relative arrangement of the parts, the counter, and the letter-tray. Fig. 5 is a transverse vertical section showing a detail of the packer mechanism. Fig. 6 is a detached side view of the packer mechanism. Fig. 7 is a detached plan view of one form of the marker-actuating mechanism, showing details of construction, the parts being shown in their normal position. Fig. 8 is an enlarged side elevation of the marking device and the actuating mechanism, as illustrated in Fig. 7. Figs. 9 and 10 represent top plan views of marker-actuating mechanism, the parts being shown in two consecutive positions occupied by them as a piece of mail-matter passes this mechanism. Fig. 11 shows the arrangement of the carrying-belts. Fig. 12 shows the arrangement of the belts when the bottom belt consists of a lip formed on the wider of the feed-belts; and Fig. 13, Sheet 6, a detail isometric view showing the stop mechanism for the die-section forming part of the marking mechanism.

The frame of the machine is composed of the bed A and legs B B. Upon the bed A are mounted the operative parts of the mechanism, among which is the letter-supporting feed-bed, consisting in the present instance of the letter-feed or carrying-belts $a\ b\ c$. The belt or carrier $a$ is supported at the end next to the fly-wheel, as shown in Fig. 2, in an inclined yoke on a drum $a'$, and it passes around a pressure-roller $a^3$, which is arranged vertically in relation to the bed A.

The carrying-belt $b$ is supported in an inclined yoke $b^2$, as best shown at Fig. 1, the opposite end of said belt or carrier $b$ passing around the upper section of the marking-roller, which stands vertically in relation to the supporting-bed A and opposite to the pressure-roller $a^3$, which carries the belt $a$.

A horizontal belt $c$ passes over drums $c'\ c^2$ at opposite ends of the machine immediately underneath the belts $a\ b$. The drum $c^2$ is supported on a vertical extension of the bracket I, as shown in Fig. 1, and it will be observed that the belts $a\ b\ c$ constitute the feed-carriers by which the mail-matter is fed to the marking and packing mechanism, as will be more particularly described when I describe the operation of the machine.

As best seen in Figs. 1, 2, and 4, the gears $i\ i\ i\ i\ i\ i$ communicate motion to the belt-drums from the main shaft H, which is journaled in bearings mounted on the supporting-bed A.

Power is transmitted to the shaft H by a belt $h^4$ and the pulleys G from the pulleys F on the treadle crank-shaft C, said shaft being provided with a fly-wheel D, as shown in the drawings. One of the pulleys G is tightly secured to the shaft H and the other pulley G turns loosely thereon, whereby the two pulleys form what are usually termed a "tight" and a "loose" pulley.

The shipper L is provided for throwing the feeding device in and out of operation, as desired.

J represents the facing-table, (best shown in the plan view, Fig. 4,) upon which the letters are faced, whence they pass through an opening $j$ onto the letter-carriers just described.

The marking device Y is composed of two parts $y\ y'$, as best shown in the enlarged detached view, Fig. 8. Both of said parts are journaled upon the shaft Y'. The part $y$ is constantly rotated, preferably by the belt $b$ passing around the same, as shown best in Fig. 3, and is provided upon its lower head with a ratchet R, while the die-carrying section $y'$ is normally at rest and is provided with dogs $r\ r$, as best shown in Figs. 7, 9, and 10, which serve to connect the section $y'$ with the upper constantly-rotating section $y$, as presently described.

Cam-triggers $r'\ r'$ are pivoted on the head of the section $y'$, and when the marking-die is at rest said triggers are tensioned by springs 2, so that their long limb rests on a shoulder or offset 1 in the short limb of the dogs $r\ r$, and their short limb lies normally in close proximity to the periphery of the head of the die-carrying section $y'$. As best seen in Figs. 7 and 8, the lower head of said section $y'$ is provided with a cam W, against the periphery of which an upward projection $w''$ on a pivoted lever $w$ is yieldingly forced by the spiral S, having one end secured to said lever and the other to a suitable support. (Not illustrated.) This cam is formed on its periphery with two oppositely-arranged inwardly-extending engaging shoulders $w'$, Fig. 7, which are located at the end of two oppositely-arranged inclines or teeth on said periphery. The end of the lever $w$ is forced outward by said cam-teeth against the action of the spring S, and when registered with the shoulders $w'$ its upwardly-extending projection is immediately drawn by the spring S into engagement with said shoulder $w'$. As there are two of the shoulders $w'$, the die-carrying section $y'$ of the printing-roller is stopped after every half-revolution, and the cam W and the lever $w$ thus constitute a stop mechanism for automatically defining the impression made by the printing-dies $y^2$, Fig. 8. When, as presently described, the die-carrying section $y'$ is again brought into action, the lever $w$ is readily forced outward by the incline of the cam W, as said cam revolves until the next stop-shoulder $w'$ is registered with and engaged by said lever $w$, thus preventing the dies $y^2$ from rebounding or rotating in a reverse direction to that indicated by the arrow. The friction of the lever $w$ against the cam W causes the same to act as a brake and to immediately stop the rotation of the loosely-journaled die-carrying section $y'$ as soon as the dog $r$ is released from the ratchet R, and hence the section $y'$ is released from the constantly-rotating section $y$.

Supported on an extension of the bed A is a finger Z, provided with a projection $z$, which extends into the path of the short or outward-extending limb of the dog $r$ and serves to throw off the dog $r$ against the action of its tensioning-spring 3 and from its contact with the ratchet R on the section $y$ of the marking device. It will be observed that the marking-die is arranged with its forward extremity lying or projecting into the letter-path, so that the die commences to register on the letter when the advancing end of the letter encounters the die. The marking-die is both normally at rest and in the path of the letter.

The action of the die-carrying section $y'$ is controlled by means of the contact-finger or stamp-tripper, which is composed of a movable lever or levers suitably connected to the marker-actuating means, and motion is transmitted to said die-section $y'$ by means of the rotating section $y$ and the actuating devices between such section and $y'$ when the stamp-tripper is moved by the advancing letter or other mail-matter.

As best illustrated in Figs. 7 to 10, the contact-finger or stamp-trigger consists of two levers X and X', connected in the manner shown and hereinafter described to the trip-lever $X^2$. The levers X X' are forced to operative position by springs 5 and 6 and lie normally in the path of the movement of the mail-matter against the carrying-belt $a$ and are pivoted to each other at $x^4$, Fig. 8, with one lever, X, pivoted at $x^3$ to the lever $X^2$, and the other lever, X', pivoted to a post 4 on the main frame at $x^5$.

The lever $X^2$ is pivoted at $x^2$ to a post $x^6$ on the frame A, and said lever $X^2$ is provided with a shoulder which lies in close proximity to the short limb of the trigger $r'$ on the head of the section $y'$ of the marker.

The action of the stamp tripping or releasing device is as follows: The extremities of the levers X X' lie normally in the path of the movement of the mail-matter, and when encountered thereby said levers are forced backward against the action of the springs 5 and 6 and force the lever $X^2$ into contact with the trigger $r'$, as shown at Fig. 9. This lever $X^2$ then rocks the cam-trigger against the action of its tensioning-spring 2 and disengages the long arm of said trigger from the shoulder 1 on the short arm of the dog $r$, whereupon the spring 3 forces said dog into engagement with the ratchet R, secured to the loosely-rotating drum $y$, and thereby effects a half-revolution of the marking portion $y'$, rigidly secured to the shaft $Y'$. As the lever X approaches the farther lever X' the lever $X^2$ is withdrawn from contact with the cam-trigger $r'$, as illustrated at Fig. 10, and both levers X X' are caused to resume their normal position, as indicated in Fig. 7, and to be pressed yieldingly toward the carrier-belt $a$ by the springs 5 6 after the passage of the mail-matter.

The function of the three levers X X' $X^2$ with respect to each other will be readily understood upon reference to Figs. 8, 9, and 10 of the drawings. Their action in respect to each other is as follows: As the letter advances toward the die releasing or tripping device it first encounters the end of the lever X, forcing the same away from the carrier-belt $a$ and causing it to swing on the pivot $x^4$ as a center. At the same time it carries along with it the trigger-tripping lever $X^2$, which is attached to the lever X by the pivot $x^3$ and causes the end of said lever to strike against the outwardly-extending limb of the trigger $r'$, thus disengaging the same from the shoulder I on the dog $r$, whereby the said dog is released and caused to engage the ratchet R on the continuously-revolving part $y$ of the marking-roller Y. The die-carrying section $y'$ is thus caused to revolve and to mark the letter. Immediately after the dog $r$ has been released the mail-matter strikes against the end of the second lever or finger, X', thereby rocking said lever on its pivot $x^5$, mounted on the post 4. The pivot $x^4$ is thereby caused to swing toward the belt $a$, and the lever $x$, swinging with the said pivot, causes the pivot or center $x^3$ to swing toward the belt $a$, whereby the end of the trigger-tripping lever $X^2$ is caused to move away and out of the path of the outwardly-extending limb of the trigger $r'$ in time to allow the same to pass with the now-revolving die-carrying section $y'$.

As previously stated, as soon as the dog $r$ (which is secured to the die-carrying section $y'$) engages the ratchet R the die-carrying section commences to revolve and impresses the die $y^2$ upon the moving letter. This revolution of the die-carrying section continues until the extended limb of the dog $r$ comes in contact with the disengaging projection $z$ of the finger Z, which throws the dog $r$ out of engagement with the ratchet R, whereupon the pivoted lever $w$, which has followed the cam W in its revolution, stops the die-carrying section $y'$ in position ready to operate on the next letter. As the dog $r$ is disengaged from the ratchet R its short arm swings around sufficiently to cause its shoulder 1 to be engaged by the catch or shoulder on the spring-trigger $r'$, whereby the said dog is held out of engagement with the ratchet until again released, as above described. (See the lower dogs in Figs. 9 and 10.) A small idler $u$, Figs. 7, 9, and 10, is placed opposite the contact-finger or releaser X, X', and $X^2$ and serves to press the advancing end of the mail-matter into contact therewith, and thus insure the engagement of the end of the letter with said contact-finger.

The belt-carrying drum $a^3$ constitutes a pressure-roller and is located opposite to the marking-roller, as shown in Figs. 7, 9, and 10, and is sustained yieldingly in a yoke N, mounted on the supporting-bed A, as best illustrated in Fig. 3.

An elliptic spring V, Fig. 3, yieldingly supports the bearings of the pressure-roller $a^3$ and enables the passage of letters of different thicknesses.

The dies $y$ are inked by the inking-roller O, which is sustained in an oscillating yoke $o$, Fig. 1. The bottom belt $c$ extends longitudinally over the letter-supporting bed, as shown in Fig. 1, and across the letter-tray K for the purpose of carrying the letters into the tray after they pass the marking device. The belt $c$ also serves to carry the letters to the feeding-belts $a$ and $b$ when the letters are fed into the machine from the facing-table.

The letter-counter is shown in plan view, Fig. 4, at T, and consists of any ordinary and suitable counting mechanism connected in any desirable manner to the marking device, whereby every impression of a marking-die, which represents the passage of a letter through the machine, is accurately recorded on the counter. It is, however, deemed unnecessary to specifically describe herein said counter and the mechanism connecting the same to the marking-die.

A glass port $v'$ is provided in the top of the facing-table, as shown in Fig. 4, where the indicator can be read off when desired.

The packing mechanism P is best illustrated at Figs. 1, 3, 5, and 6, and consists, essentially, of oscillating arms $p\ p'$, which are connected by the oscillating connection $h^3$ and pitmen $h'\ h^2$ to the face-plate crank $h$, which is located on the shaft H, as shown at Fig. 6. The oscillating arm $p$ projects through the slot in the frame of the facing-table over the belt $c$ and serves to push the latter out of the letter-channel $k$, as shown in Fig. 5, into the tray K, where the arm $p'$ pushes the letters along the bottom of the tray toward the outgoing mail.

It will be understood that a block, as indicated in dotted lines at Q in Fig. 5, slides along the bottom of the tray and is placed so as to support letters upon their edges as they drop into the tray and that the arms $p\ p'$ of the packer P alternately oscillate in and out, as shown by the dotted lines in said Fig. 5. These packer-arms $p\ p'$ extend nearly across the tray K, as shown in Fig. 6, and oscillate on the shafts $p^2\ p^3$ in a frame supported on the bracket I, as shown in Figs. 1 and 6 aforesaid. The packer P is actuated by the rotation of the shaft H, and its action is timed with the speed of the feeding-carriers, so as to act in harmony therewith.

In describing the operation of the invention I desire to call attention to the fact that the letters are placed on the facing-table, as shown in Fig. 4, and are fed from said table into the machine with the postage-stamps uniformly arranged.

The letters or mail-matter which drop on the inclined belt $a$ rest edgewise on the bottom belt $c$ in the letter-channel, and when power is applied to the machine the letters are carried forward to the carrying-belts $a\ b$, between which they are carried onward to the marking device Y. As they pass the contact-finger X X' the lever $X^2$ is brought into contact with the trigger $r'$, which in turn throws the dog $r$ into engagement with the revolving ratchet and brings into action the marking-dies, thereby canceling the stamps and impressing the postmarks on the moving mail-matter. On passing the marking device the letters are moved on the belt $c$ to the packing mechanism, the upper arm of which strikes the lower edge of the letter and causes the letter to drop in the tray, whereupon the lower arm of the packer pushes it onward toward the outgoing mail, each succeeding letter, newspaper, or postal card fed through the machine being treated in the same manner.

The action of the marking and packing devices is continuous in consequence of the automatic action of the marking device. Hence the machine can be fed with great rapidity without impairing the efficiency of its action on the moving mail-matter.

It is to be observed that the marking-die being arranged near the letter-supporting bed, consisting, in the present instance, of the horizontal belt $c$, adapts the machine to letters of varying widths, because the postage-stamp end of the letter comes near the bottom of the supporting feed-bed in the movement of the mail-matter through the machine, and letters of different thicknesses pass through freely, owing to the arrangement of the pressure-roller in the slotted yoke N, as previously described.

I do not restrict myself to the construction and arrangement of the carrying-belts, as the bottom belt $c$ may be dispensed with and any other suitable movable bottom support substituted therefor. Thus the belt $a$ can be provided with a lip $c$ integral therewith, as illustrated at Fig. 12; nor do I restrict myself to the construction and arrangement of the letter-marker, the essential characteristics of which consists in constructing the marker in two sections and rotating one constantly, while the other is normally at rest, then bringing the dormant section into action through the medium of the moving mail-matter by any arrangement of mechanism suitable for the purpose.

Although I employ two dies $y^2\ y^2$ on the die-carrying section, by means of which the work of the marker is considerably lessened, inasmuch as it requires but a half-revolution of the marker to a mark a letter, yet I do not limit my invention to any particular number of dies, neither do I limit it to its precise form and construction, since the same may be considerably varied without departing from the spirit of my invention. I do not, however, claim, broadly, the combination, with a letter-supporting feed-bed, of a movably-supported marking-roller held normally at rest, nor the combination, with a letter-feed, of a marking-roller, and a contact-finger connected to operate the marking-roller without stopping the letter to control the registry of the marking-die thereon, as the same forms the subject-matter of my pending application, Serial No. 143,259, filed September 17, 1884.

Having thus fully described my invention, what I claim as new, and desire to secure by Letters Patent, is—

1. In a mail-marking machine, the combination with a supporting feed-bed, of a letter-feed composed of belts carried respectively on the impression-roller and upon a continuously-rotating feed-roller journaled on the marking-roller shaft, of a marking-roller mounted on the shaft with said feed-roller and held normally at rest, intermediate connecting means between the marking-roller and the continuously-acting feed-roller, a contact-piece in the letter-path coöperating with said intermediate connecting means, and means for stopping the marking-roller after it has registered, substantially as and for the purpose specified.

2. In a mail-marking machine, the combination of a facing-table, a continuously-acting feed, a marker having its journal-shaft normally at rest and provided with a pinion meshing with a counting mechanism actuated by said marker, intermediate connecting means between the feed and marker, means for stopping the marker after it has registered, a contact-piece in the letter-path coöperating with the intermediate connecting means, and a letter-packer suitably connected to act conjointly with the marker, substantially as and for the purpose specified.

3. In a machine for stamp-canceling or marking mail-matter, the combination, with a letter-marker for marking letters, of two carrying-belts or conveyers arranged with their carrying-surfaces contiguous to each other for feeding the mail-matter to the marker, and a movable bottom support for supporting the letters fed between said carrying-belts, substantially as set forth.

4. In a machine for stamp-canceling or marking mail-matter, the combination, with a letter-marker, of a movable bottom support for supporting the letters edgewise, and two carrying-belts or conveyers arranged with their carrying-surfaces contiguous to each other, one of said belts having its lower edge above said marker for exposing the letter to the action of the marker, substantially as set forth.

5. In a letter-marking machine, the combination with a feed; of a marking-roller, an impression-roller, and an oscillating letter-packer; of suitable connections between the feed and marker for starting and stopping the marker, and between the marker and packer for actuating the packer in conjunction with the marker, and means for guiding the letters into the receiving-tray, substantially as and for the purpose set forth.

6. In a letter-packing mechanism consisting of oscillating packer-arms, one beneath the other, a shaft, as H, and connections, substantially as described, between the said shaft and arms for oscillating the arms in relation to each other, substantially as set forth.

7. In a machine for marking mail-matter, the combination with a marker normally at rest, a continuously-acting feed-roller journaled on the marking-roller shaft, said marker and rotating feed-roller being provided respectively with a dog and ratchet for intermittently connecting the feeding-roller and marker, a contact-finger projecting into the letter-path, and means, substantially as described, between the dog and the contact-finger, and operated by the latter to bring the marker into action, substantially as set forth.

8. In a machine for marking mail-matter, the combination with a marker normally at rest; of a continuously-acting feed-roller journaled on the marking-roller shaft, said feed-roller and marker carrying respectively a ratchet and dog for intermittently connecting the marker to said feed-roller; of a contact-finger projecting into the letter-path, and means, substantially as described, between the dog and finger, whereby the marker is brought into action, and a stop device for forcing said dog from operative engagement with the ratchet, substantially as set forth.

9. In a machine for stamp-canceling or marking mail-matter, the combination, with a marker normally at rest, a continuously-acting feed-roller journaled on the marking-roller shaft, a ratchet and dog for connecting said continuously-acting feed-roller and marker, of a contact-finger projecting into the letter-path, means, substantially as described, between said dog and finger, whereby the marker is brought into action, a stop for forcing said dog from operative engagement, and a stop for preventing the die from rebounding or rotating in a reverse direction, substantially as set forth.

10. The combination, with a letter-marker composed of a rotating section and a die-carrying section, normally at rest, of a ratchet and a dog for connecting the rotating section with the die-carrying section, a trigger, a trip-lever, as $X^2$, and a contact-finger composed of two parts, $X$, $X'$, and connected to the trip-lever, substantially as set forth.

11. In a letter-marking machine, the combination of a continuously-acting feed-roller loosely mounted on the marking-roller shaft, a marking-roller normally at rest, a ratchet and dog carried by the feed-roller and marker for intermittently connecting the marker to the feed-roller, a disengaging finger as Z, and means for holding the dog disengaged until released by the passage of a letter, and means for releasing said dog operated by the passing letter, substantially as set forth.

12. In a rotating letter-marker, the combination, with the die-section, of an automatic stop device consisting of a cam, as W, having shoulders, $w'$, and a lever, as $w$, substantially as set forth.

13. The combination, with a letter-marker, of a contact-finger composed of two pivoted levers, $X$, $X'$, normally projecting into the letter-path, a trip-lever, connected, substantially as described, to one of the aforesaid levers, and connections between the marker and the trip-lever for governing the movement of said marker, substantially as and for the purposes set forth.

14. The combination of a supporting feed-bed with a marking-roller and an impression-roller, the said marking-roller being rigidly secured to its shaft and held normally at rest, the marking-roller shaft serving as a journal for a loosely-mounted continuously-rotating feed-roller, intermediate connected means between said feed-roller and the marker, the said marker-shaft being also provided with a pinion meshing with the gear of a registering mechanism, a registering mechanism or counter, and a contact-finger in the letter-path connected to start the marking-roller when a letter comes in contact with said contact-finger, whereby the letter is both marked and registered, substantially as set forth.

15. The combination of a supporting feed-bed, a marking-roller and pressure-roller, the shaft of the marking-roller being provided with a loosely-journaled feed-roller carrying a feed-belt, which serves in connection with a feed-belt carried by the pressure-roller as a letter-feed, the marking-die being normally at rest, and connecting devices substantially as described, between the feed-roller and marking-roller shaft; with a contact-finger projecting into the letter-path, a trip-lever, and a stop device, whereby the marking-roller is automatically connected with the belt-carrying roller whenever a letter passes and automatically disconnected after the marker has registered, substantially as set forth.

In testimony whereof I have hereunto signed my name, in the presence of two attesting witnesses, at Syracuse, in the county of Onondaga, in the State of New York, this 2d day of July, 1890.

GEORGE W. HEY.

Witnesses:
CLARK H. NORTON,
H. E. CHASE.